United States Patent [19]

Towle et al.

[11] Patent Number: 4,845,179

[45] Date of Patent: Jul. 4, 1989

[54] PREPARATION OF ORGANIC POLYMERS USING ORGANOMETALLIC CAPPED MONOMERS TO PRODUCE METAL FREE POLYMERS

[75] Inventors: Ian D. H. Towle, Cirencester, England; Patrick J. Horner, Menlo Park, Calif.

[73] Assignee: Raychem Limited, London, England

[21] Appl. No.: 257,159

[22] Filed: Oct. 12, 1988

Related U.S. Application Data

[63] Continuation of Ser. No. 163,225, Feb. 26, 1988, abandoned, which is a continuation of Ser. No. 900,473, Aug. 22, 1986, abandoned, which is a continuation-in-part of Ser. No. 833,656, Feb. 21, 1986, abandoned, which is a continuation of Ser. No. 704,452, Feb. 22, 1985, abandoned.

[30] Foreign Application Priority Data

Feb. 27, 1984 [GB] United Kingdom ................. 8405049

[51] Int. Cl.$^4$ .................... C08G 63/22; C08G 63/34; C08G 63/62; C08G 63/64
[52] U.S. Cl. ....................................... 528/9; 528/166; 528/176; 528/180; 528/196; 528/200; 528/271; 528/371; 528/372; 528/395; 525/389
[58] Field of Search ............................. 528/9, 166, 395

[56] References Cited

U.S. PATENT DOCUMENTS

| | | | |
|---|---|---|---|
| 2,435,429 | 8/1943 | Evans | 528/308 |
| 3,153,010 | 10/1964 | Jenkins et al. | 528/283 |
| 3,194,791 | 7/1965 | Wilson et al. | 528/283 |
| 3,330,872 | 7/1967 | Weesner | 568/599 |
| 3,408,334 | 10/1968 | Caldwell et al. | 528/319 |
| 3,480,656 | 11/1969 | Heiss | 556/87 |
| 3,703,564 | 11/1972 | White | 525/397 |
| 3,898,196 | 8/1975 | Keck | 528/299 |
| 4,075,319 | 2/1978 | Dyckman et al. | 424/78 |
| 4,358,568 | 11/1982 | Fox et al. | 525/439 |
| 4,611,049 | 9/1986 | Kuratsuji et al. | 528/180 |

FOREIGN PATENT DOCUMENTS

| | | |
|---|---|---|
| 513183 | 4/1970 | Australia. |
| 408635 | 10/1980 | Australia. |
| 513182 | 11/1980 | Australia. |
| 786853 | 6/1968 | Canada. |
| 50821 | 5/1982 | European Pat. Off.. |
| 1044015 | 9/1966 | United Kingdom. |
| 1137151 | 12/1968 | United Kingdom. |

OTHER PUBLICATIONS

Kricheldorf et al., Polym. Bull. 1, 383 (1979).
Chem. Abs. 72:12133v (1970) (abstract of FR 1,566,217).
Chem. Abs. 70:115281e (1969) (abstract of Bull. Soc. Chim. Fr. 1969, pp. 262–263).
Towle et al., "Preparation of Monomers", Ser. No. 07/204,650, filed Jul. 29, 1988.
Towle et al., "Preparation of side chain polymers", Ser. No. 06/899,460, filed Aug. 22, 1986.

*Primary Examiner*—John Kight
*Assistant Examiner*—Frederick Krass
*Attorney, Agent, or Firm*—Yuan Chao; Edith A. Rice; Herbert G. Burkard

[57] ABSTRACT

A method for the preparation of a variety of engineering polymers and copolymers, in particular aromatic polymers and copolymers which comprises reacting a stannylated reactant containing a first monomeric or polymeric moiety with an electrophilic reactant, usually a di(acid chloride) containing a second monomeric or polymeric moiety. The intermediate and second compound react by way of a condensation reaction to eliminate the tin and polymerize together the first and second moieties. Some novel polymers and copolymers can be prepared using this method.

11 Claims, No Drawings

PREPARATION OF ORGANIC POLYMERS USING ORGANOMETALLIC CAPPED MONOMERS TO PRODUCE METAL FREE POLYMERS

This is a continuation of Ser. No. 7/163,225, filed Feb. 26, 1988, now abandoned, which is a continuation of Ser. No. 6/900,473, filed Aug. 22, 1986, now abandoned, which is a continuation-in-part of Ser. No. 6/833,656 filed Feb. 21, 1986, now abandoned, which is a continuation of Ser. No. 6/704,452, filed Feb. 22, 1985, now abandoned.

This invention relates to a method of preparing organic polymers and copolymers.

Condensation polymers and copolymers such as polyesters, polycarbonates, polyamide, polyimides and polyurethanes, which can be used, for example, as engineering thermoplastics, low smoke polymers, or conductive polymers, are commercially prepared by a variety of methods, many of which require high temperatures and/or potentially hazardous reagents. Studies have been carried out in which certain polymers have been prepared via specific intermediates. For example Polymer Bulletin 1, pp. 383-388 (1979) discloses a method of preparing polyesters using a trimethylsiloxy intermediate, and Canadian Pat. No. 786 853 describes a methodoof preoaring a polyimide using a triorganosilyl amine intermediate. However, both of these methods still require relatively high temperatures, for example between 150°-300° C.

Conventional commercial production of block alternating condensation copolymers is difficult because the copolymerisation temperature is normally carried out at temperatures above the melting point of the polymer blocks, in the range of 280° C. 320° C., and therefore they tend to randomise and become random copolymers. Block copolymers are known which do not randomise but only where at least one of the blocks is stable at the copolymerisation temperature. An example is the block copolymer 'Hytrel' (trade name - from Du Pont) which does not randomise because it contains aliphatic polyethers which do not interchange at the reaction temperature.

It has now been discovered, according to the present invention, that polymers and copolymers can be synthesised by a more convenient, low-temperature method and that the aforementioned problem of randomisation of block copolymers can be alleviated.

Accordingly the present invention provides a method for the preparation of a polymer or copolymer comprising reacting a monomeric, oligomeric or polymeric nucleophilic reactant of the formula:

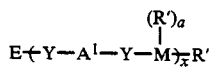  (I)

where E is either the group $(R')_b M-$ or

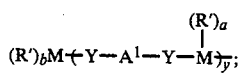

each M is independently an element selected from Group III, IV or V of the Periodic Table or a transition metal, excluding carbon, silicon, nitrogen, phosphorus, boron aluminium, and titanium;

each R' is indeoendently a substituted or unsubstituted alkyl or aryl group;

each Y is independently an atom or group selected from oxygen, sulphur, or substituted nitrogen or phosphorus;

each $A^1$ is independently an aromatic, aliphatic, aromatic/aliphatic, heterocyclic, alicyclic, siloxyl or silane monomeric, oligomeric, or polymeric moiety;

each a is independently an integer two less than the valence of the element M to which it pertains;

each b is an integer one less than the valence of the element M to which it pertains; and x and y are each independently an integer greater than or equal to 1, with a substantially stoichiometric amount of an electrophilic reactant selected from the group consisting of (i) a compound of the formula

  (VI)

where each X is independently halide, imidazole, RO—, RS—, or a group capable of reacting with the first ractant to eliminate a by-product containing M and X, R being a substituted or unsubstituted aromatic or aliphatic group or hydrogen;

each B is independently carbon, phosphorus, sulfur, silicon, or a direct bond;

each Z is independently oxygen, sulfur, or an imino group;

each D is independent an aromatic, aliphatic, RO—, RS—, or $R_2N-$ group if B is phosphorus and an aryl, alkyl, or an RO—group if B is silicon;

each d is independently 1 if B is carbon; 0 or 1 if B is phosphorus; 0, 1 or 2 if B is sulfur; and 0 if B is silicon or a direct bond;

each e is independently 0 if B is carbon, sulfur, or a direct bond; 1 if B is phosphorus; and 2 if B is silicon; and $A^2$ is an aromatic, aliphatic, aromatic/aliphatic, heterocyclic, alicyclic, siloxyl, or silane monomeric, oligomeric, or polymeric moiety, which is the same as or different from $A^1$, or a direct bond;

(ii) a compound of the formula

where X, B, Z, D, d, and e are as hereinbefore defined, provided that B is other than a direct bond; and (iii) combinations of (i) and (ii);

to produce a polymer having the repeat unit

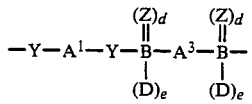

where $A^3$ is $A^2$ or $Y-A^1-Y$.

The element M is preferably tin, germanium, lead, or thallium, more preferably, tin or germanium; especially preferably, tin. One reason for the desirability of tin is the high cost of germanium compounds compared to tin. Tetravalent tin is particularly preferred.

The group R' is, for example, a lower alkyl group such as methyl, ethyl, isopropyl, n-propyl, n-butyl, and isobutyl, or an aryl group such as phenyl. Methyl and n-butyl are preferred.

Y is preferably oxygen or $NR^2$, where $R^2$ is lower alkyl or hydrogen.

The group $A^1$ is, for example, substituted or unsubstituted p-phenylene, m-phenylene, 1,4-naphthylene, 2,6-naphthylene, 2,6-pyridinediyl, 2,6-pyridinediyl, C-1 through C-6 saturated or unsaturated alkylene, or -p-Ph-K-p-Phwhere p-Ph is p-phenylene and K is a direct bond, O, S, carbonyl, sulfone, or C-1 through C-6 saturated, unsaturated, or fluorinated alkylene. Preferably, $A^1$ is p-phenylene, m-phenylene, or -p-Ph-K-p-Ph-, where K is methylene, isopropylidene, or sulfone. $A^1$ can also be oligomeric or polymeric, for example, a silane or siloxane oligomer or polymer. Further examples of suitable groups $Al_1$ can be found in the recitation of suitable reagents R"—Y—$A^1$—Y—R" (IX), hereinafter.

X is preferably halide, especially chloride or bromide, more especially chloride. Where X is RO— or RS—, R is preferably lower alkyl, for example methyl or ethyl, or phenyl.

B is preferably carbon or sulfur, especially carbon.

Z is preferably oxygen.

D is preferably phenyl, lower alkyl, such as methyl or ethyl, or RO— or $R_2N$— where R is lower alkyl, for example methyl or ethyl, or hydrogen.

The group $A^2$ is, for example, substituted or unsubstituted p-phenylene, m-phenylene, 1,4-naphthylene, 2,6-naphthylene, 2,6-pyridinediyl, 2,6-pyridinediyl, C-1 through C-6 saturated, unsaturated, or fluorinated alkylene, or a direct bond, or -p-Ph-K-p-Ph where p-Ph and K are as hereinbefore defined. Preferably, $A^2$ is p-phenylene, m-phenylene, or -p-Ph-K-p-Ph-, where K is methylene, isopropylidene, or sulfone. $A^2$ can also be oligomeric or polymeric, for example, a silane or siloxane oligomer or polymer. Further examples of suitable groups $A^2$ can be found in the recitation of suitable second reactants V, hereinafter.

In a preferred embodiment of the invention, E is $(R')_bM$; M is tetravalent tin, R' is lower alkyl; Y is oxygen or $NR^2$; x is 1; x is chloride; B is carbon; and Z is oxygen.

In one aspect of the present invention the nucleophilic reactant (I) is of the formula:

$$R'_b—M—Y—A^1—Y—M—R'_b \qquad (II)$$

where R', M, Y, $A^1$ and b are as defined above.

An example of intermediate (II) is a compound having the formula $Bu_3$-Sn(4+)-0-$A^1$-0-Sn(4+)-$Bu_3$ In another aspect of the present invention the nucleophilic reactant (I) is an oligomer of the formula:

$$R'_b—M(Y—A^1—Y—M)_y R' \qquad (III)$$
$$\quad\;\;|\;\;\quad$$
$$\quad R'_a$$

where Y, $A^1$, M, R' and b are as defined above; and y is an integer greater than or equal to 2.

An example of nucleophilic reactant (III) is a compound having the formula:

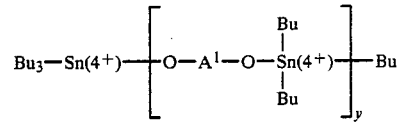

In a further aspect of the present invention the nucleophilic reactant (I) is of the formula:

$$R'_b—M(Y—A^1—Y—M'_x Y—A^1—Y —M —R'_b \qquad (IV)$$

where
M, Y, R', b, A' and x are as defined above; and
M' is a divalent element selected from Group IV of the Periodic Table excluding carbon and silicon; preferably divalent tin or lead.

An example of nucleophilic reactant (IV) is a compound having the formula:

$$Bu_3—Sn(4+)[-O—A^1—O—Sn(2+)]_x O—A^1—O—Sn(4+)—Bu_3$$

Hereinafter the term "nucleophilic reactant" shall be taken to mean any one of (I), (II), (III) or (IV), unless otherwise specified.

By substituted nitrogen is meant, for example, a substituted or unsubstituted amine or amide group, and by substituted phosphorus is meant an analogous phosphorus groups.

Examples of nucleophilic reactant (VI) include phosgene, sulphuryl chloride, thionyl chloride, and phenyl phosphonic acid dichloride.

Condensation polymers and copolymers can therefore be prepared by the process according to the present invention. In many cases the polymerisation or copolymerisation reaction will be a condensation reaction directly eliminating the by-product, while in other cases the by-product may not be immediately eliminated by the condensation reaction, and can be removed by later processing.

This invention has a number of advantages over known methods for preparing such polymers and copolymers.

Firstly the process can be carried out at conveniently low temperatures, preferably 0°–150° C., more preferably 40°–80° C., although it is to be understood that higher and lower temperatures can also be used. Low temperatures are especially advantageous when thermally sensitive groups are to be incorporated into the polymer or copolymer. For example carbon-carbon double and triple bonds can be incorporated without cross-linking occurring, nitrogen-nitrogen bonds can be included without the risk of nitrogen evolution, as can halogenoethylyl groups without the risk of dehydrochlorination, and carbodiimide groups can be incorporated. Also, by using the method according to the present invention, it is possible to prepare, for example, copolymers wherein one type of polymer block is thermally sensitive, and copolymers wherein the different types of polymer block each contain different thermally sensitive groups.

The reagents used in the process can be chosen to be relatively non-hazardous, for example by using n-butyl tin(4+) derivatives.

Another advantage is that the by-product of the process is soluble in many solvents, making purification of the polymeric product an unusually easy task. Furthermore the by-product can be readily converted back to the starting reagent.

The present invention is especially advantageous in that it provides a useful method for the preparation of copolymers, especially condensation copolymers. By copolymer is meant a polymer containing two or more different repeating units. These different repeating units may be from the same family, for example both esters, to give a copolyester, or they may be from different families, for example an ester and an amide to give a copolyesteramide. Three or more different monomers may be copolymerised to make terpolymers, which will hereinafter be included within the term "copolymer". Condensation copolymers are copolymers wherein one or more of the polymer blocks is a condensation polymer.

Random, alternating and block copolymers can all be prepared by the process according to the present invention, but the preparation of controlled block copolymers is especially useful as such polymers are often difficult to prepare using known commercial methods, as stated above.

By block copolymer is meant a compound containing at least two different blocks, at least one of these blocks being polymeric. Usually all the blocks incorporated in the copolymer are polymeric and hereinafter each compound block shall be referred to as a polymer block although it is to be understood that blocks comprising a single unit are also included.

Many different types of copolymer can be prepared by the process according to the present invention. For example, multi-block copolymers, of the type ABABA . . . or containing more than two different blocks, may be prepared. A-B di-block copolymers can also be prepared, these being useful in the blending of polymers of the type A and type B.

Random copolymers may be obtained by mixing the different monomers together before any substantial polymerisation has taken place. Alternating copolymers may be obtained by allowing complete reaction of, for example, two monomers before the addition of another monomer, followed by polymerisation to high molecular weight.

The number average molecular weight of a polymer or copolymer obtained by the process according to this invention is preferably at least 10,000, more preferably at least 30,000, expressed as number average molecular weight in polystyrene equivalents measured by GPC or of Reduced Viscosity at least 0.25 preferably greater than 0.7 for a 1% solution at 25° C. Usually higher molecular weights are needed to optimise properties in the case of those polymers of an aliphatic nature than for those with a largely aromatic nature.

The solvent used for the process is chosen such that the desired molecular weight of the chosen polymer is reached. Altering the structural form may necessitate a change of solvent, for example, the random copolymer of any given set of specific monomers may have different solubility parameters from the alternating isomer, the random or less ordered copolymer usually being more soluble in any specific solvent than an alternating or more ordered copolymer. The solvent or specific mixtures of solvents chosen can be used as a method of molecular weight control, especially when blocks of particular molecular weight are needed. Many solvents dissolve the by-product leaving a relatively clean polymer which can be cleaned further by solvent extraction. Typical reaction solvents include, for example, chloroform, xylene, toluene, tetrahydrofuran, chlorobenzene, 1,2-dichloroethane and dimethylformamide. Complex reaction solvents can also be used, such as lithium chloride/dimethelacetamide.

If desired the process may include the use of one or more catalysts to enhance the reaction rate. Catalysts suitable for the process can be readily determined experimentally by a person skilled in the relevant field, an example being N,N-dimethylamino-pyridine.

As will be readily apparent to one skilled in the field of polymer synthesis, by appropriate selection of nucleophilic and electrophilic reactants, polymers or polymer blocks, for example esters, carbonates, thioesters, thiocarbonates, amides, thioamides, imides, thioimides, urethanes, fluoroaromatics, fluoroaliphatics and sulphonylimides can be prepared by the process of the invention. Copolymers can be similarly prepared by combining two or more of the above polymer blocks by the process according to the present invention, for example copolyesteramides and terpolyesteramideurethanes. It is to be understood that oligomers are included within the term 'polymer'.

The nucleophilic reactant can be obtained by a number of different methods. The nucleophilic reactant having the formula (II) may be prepared, for example, from (i) a reagent having the formula:

   (VII)

where R', M and b are as defined above, an example of reagent (VII) being:

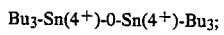

or (ii) a reagent having the formula:

$R'_b$—M—X   (VIII)

where
  R', M and b are as defined above; and
  X is halide, —OR, or —NR$_2$, where R is a substituted or unsubstituted alkyl or aryl group or a hydrogen atom an example of reagent (VIII) being Bu$_3$-Sn(4+)-OMe; and reacting either reagent, in substantially stoichiometric proportions, with either (a) a compound having the formula:

   (IX)

where
  Y and A' are as defined above; and
  each R" is independently an atom selected from hydrogen, sodium, potassium or cesium, or an acetate group;

examples of reagent (IX) being H—O—A1—O—H and H$_2$N—A'—NH$_2$;

or (b) reacting reagent (VII) with a compound containing a carbonyl, thiocarbonyl, isocyanate, isothio-cyanate or nitrile group. Where a carbonyl group is used these must be activated by an electron-with-drawing group such as $CF_3$, $CCl_3$, trinitrophenyl or sulphonylphenyl; examples of such compounds include:

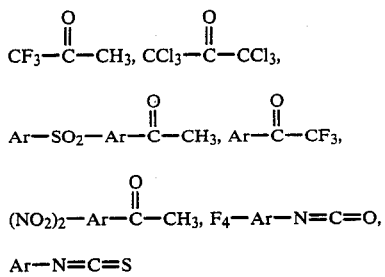

where Ar is an aryl group;
or (c) reacting reagent (VIII), where X is not a halide, with a diisocyanate, dinitrile, diisothiocyanate or dicarbonyl compound.

The nucleophilic reactant having the formula (III) may be prepared, for example, from a reagent of the formula:

where
 $R'$, $M$ and $b$ are as defined above,
 $X$ is selected from oxygen, halide, $-OR$, or $-NR_2$, where $R$ is substituted or unsubstituted alkyl or aryl group or a hydrogen atom;
 $g$ is 1 when $X$ is oxygen or 2 when $X$ is not oxygen;
and reacting reagent (XI) with compound (IX) above. Examples of reagent (XI) include $Bu_2-Sn(4+)-(OMe)_2$ and $Bu_2-Sn(4+)-O$.

The nucleophilic reactant having the formula (IV) may be prepared, for example by reacting a stannocene, such as dimethyl stannocene,

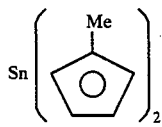

containing a sufficient amount of compound (VII) or (VIII) to act as capping agents, with compound (IX) above Preferably the nucleophilic reactant is obtained from the reaction between compounds (VII) or (VIII) and (IX) or between compounds (VII) and the carbonyl compound,

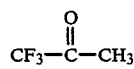

The solvent used in the preparation of the nucleophilic reactant varies with the type of reagent used. Where the by-product of the reaction is volatile, then a solvent capable of removing the by-product by distillation is preferred. For example, if the by-product is water then solvents such as xylene or chlorobenzene may be used. Where the by-product is a salt then xylene, toluene or some other inert solvent is suitable, enabling the by-product to be removed by filtration for example. It is preferred that the solvent should boil at the desired reaction temperature as this affords a simple method of temperature control by reflux.

Once the polymer or copolymer has been isolated it is possible for the by-product to be easily removed, for example by extraction with acetone, hexane, methanol or other simple solvents which do not affect the polymer adversely. The by-product can then be converted back to its original form by reaction with suitable, well-known reagents or it can be recovered by distillation.

Capping agents may be employed and are added to the polymerisation reaction mixture to cap the polymer or copolymer on at least one end of the chain. This terminates continued growth of that chain and may be used as a method of controlling the resulting molecular weight of the polymer or copolymer. Such capping agents may be added at the start of the reaction or at any time during the reaction or when it is decided to terminate the reaction. The capping agent used depends on the end to be terminated. After the polymerisation according to the present invention the polymer or copolymer chain contains substantially two different end groups, that is either the group $(R')_bM-$ or the group $-X$. To cap the group $(R')_bM-$ a capping agent such as a monofunctional acid chloride can be used, and for the group $-X$ a capping agent such as a monofunctional tin derivative of the formula $A3-OSnBu3$, where $A3$ can be any of the moieties mentioned for $A'$ but is monofunctional, can be used.

In the nucleophilic reactant the $R'$ group may be, for example, an unsubstituted alkyl group (e.g. methyl, ethyl, propyl, isopropyl, butyl, pentyl, octyl etc.), a substituted alkyl group e.g. benzyl, phenylethyl, etc.) or a substituted or unsubstituted aryl group (e.g. phenyl, napthyl, biphenyl, etc.), or an alicylic group. Preferably $R'$ is an alkyl group containing 3 or 4 carbon atoms, more preferably a butyl group, and especially an n-butyl group. The number of $R'$ groups attached to the element $M$ depends upon the valency of $M$. For example, in the intermediate of formula (II) if $M$ is tin(4+), then $b$ (the number of $R'$ groups) is 3.

Where $M$ is a transition metal, it may be any one element selected from scandium, vanadium, chromium, manganese, iron, cobalt, nickel, copper, zinc, yttrium, zirconium, niobium, molybdenum, technetium, rubidium, ruthenium, palladium, silver, cadmium, lanthanum, hafnium, tantalum, tungsten, rhenium, osmium, iridium, platinum, gold or mercury. For any given reaction, the actual transition metal chosen will depend upon its cost, availability and suitability for use in the reaction which can be determined by ordinary trial and error.

There are many groups suitable for use as the A1 and A2 moieties in the nucleophilic reactant and the electrophilic reactant (V) respectively. As stated above these moieties are selected from an aromatic, aliphatic, aromatic/aliphatic, hetero-cyclic, alicylic, siloxyl or silane bifunctional moiety. This includes substituted or unsubstituted moieties, heteroaromatic, heteroaliphatic and multiple aromatic moieties which may be joined by an oxygen or sulphur atom or a sulphone, imide or ketone group for example, moieties which are solely silicon based and contain no back-bone carbon atoms as in the case of silycic acid chlorides, or siloxane or silane chains with carbon containing moieties joined directly to silicon as chain end groups. In addition the A2 moiety may contain an appropriate atom, for example oxygen or sulphur, which is bondable with the B atom in the second compound (V). An example of such a moiety is that obtained from chloroformate.

It will be understood that reference to aromatic oligomeric or polymeric moieties mean moieties which have arylene units incorporated in the repeating unit of their backbone chain, not merely appended as side groups to the chain as for example in the case of polystyrene. Preferably these aromatic moieties will be wholly aromatic. By wholly aromatic is meant that the backbone chain of the moiety contains no two adjacent aliphatic carbon atoms. References to aromatic oligomers or polymers are to be construed accordingly.

Some examples of reagents (IX) incorporating suitable $A^1$ moieties are as follows:
hydroquinone;
resorcinol;
catechol;
chlorohydroquinone;
bromohydroquinone;
nitrohydroquinone;
methylhydroquinone;
phenylhydroquinone;
vinylhydroquinone;
allylhydroquinone;
alkoxyhydroquinone;
aryloxyhydroquinone;
acetylhydroquinone;
benzoylhydroquinone;
benzylhydroquinone;
tetrafluorohydroquinone;
dihydroxypyridine;
2,4-dihydroxy-5,6-dimethylpyrimidine;
4,6-dihydroxy-2-methylpyrimidine;
4,6-dihydroxy-2-methylmercapto-pyrimidine;
3,6-dihydroxypyridazine;
2,3-dihydroxyquinoxaline;
4,8-dihydroxyquinoline;
4,6-dihydroxypyrimidine;
3,5-dihydroxy-2-nitropyridine;
4-(p-nitrophenylazo) resorcinol;
4-hydroxylbenzylalcohol
p-xylene α, α'-diol
1,1-bis(4-hydroxyphenyl)-1-phenyl)ethane;
1,1-bis(4-hydroxyphenyl)-1,1-diphenyl methane;
1,1-bis(4-hydroxyphenyl)cyclooctane;
1,1-bis(4-hydroxyphenyl)cycloheptane;
1,1-bis(4-hydroxyphenyl)cyclohexane;
1,1-bis(4-hydroxyphenyl)cyclopentane;
2,2-bis(3-propyl-4 hydroxyphenyl)decane;
2,2-bis(3,5-dibromo-4-hydroxyphenyl)nonane;
2,2-bis(3,5-isopropyl-4-hydroxyphenyl)nonane;
2,2-bis(3-ethyl-4-hydroxyphenyl)octane;
4,4-bis(hydroxyphenyl)heptane;
3,3-bis(3-methyl-4-hydroxyphenyl)hexane;
3,3-bis(3,5-dibromo-4-hydroxyphenyl)hexane;
2,2-bis(3,5-difluoro-4-hydroxyphenyl)butane;
2,2-bis(4-hydroxyphenyl)propane (Bisphenol A)
1,1-bis(3-methyl-4-hydroxyphenyl)ethane;
1,1-bis(4-hydroxyphenyl)methane;
2,2-bis(3,5-dibromo-4-hydroxyphenyl)propane;
bis(3,5-diisopropyl-4-hydroxyphenyl)sulphoxide;
bis(3-methyl-5-ethyl-4-hydroxyphenyl)sulphoxide;
bis(3,5-dibromo-4-hydroxyphenyl)sulphoxide;
bis(3,5-dimethyl-4-hydroxyphenyl)sulphoxide;
bis(3-methyl-4-hydroxyphenyl)sulphoxide;
bis(4-hydroxyphenyl)sulphoxide;
bis(3,5-dichloro-4-hydroxyphenyl)sulphoxide;
bis(3,5-diisopropyl-4-hydroxyphenyl)sulphone;
bis(3,5-methyl-5-ethyl-4-hydroxyphenyl)sulphone;
bis(3-chloro-4-hydroxyphenyl)sulphone;
bis(3,5-dibromo-4-hydroxyphenyl)sulphone;
bis(3,5-dimethyl-4-hydroxyphenyl)sulphone;
bis(3-methyl-4-hydroxyphenyl)sulphone;
bis(4-hydroxyphenyl)sulphone;
bis(3,5-dichloro-4-hydroxyphenyl)sulphone;
2,6-dihydroxynaphthalene;
1,7-dihydroxynaphthalene;
1,6-dihydroxy-4-methylnaphthalene;
3,3',5,5'-tetrabromo-4,4'-dihydroxybiphenyl;
3,3',5,5'-tetramethyl-4,4'-dihydroxybiphenyl;
3,3'-dichloro-4,4'-dihydroxybiphenyl;
3,3'-diethyl-4,4'-dihydroxybiphenyl;
3,3'-dimethyl-4,4'-dihydroxybiphenyl;
4,4'-dihydroxybiphenyl;
bis(3-chloro-5-methyl-4-hydroxyphenyl)ether;
bis(3,5-dibromo-4-hydroxyphenyl)ether;
bis(3,5-dichloro-4-hydroxyphenyl)ether;
bis(3-ethyl-4-hydroxyphenyl)ether;
bis(3-methyl-4-hydroxyphenyl)ether;
bis(4-hydroxyphenyl)ether;
dihydroxyazobenzene;
4,4'-dihydroxybenzalazine;
dihydroxybenzophenone;
3-methyl-4,4'-dihydroxybenzophenone;
3,3'-dimethyl-4,4'-dihydroxybenzophenone;
3,3'-dichloro-4,4'-dihydroxybenzophenone;
4,4'-dihydroxybenzophenone;
2,4,4'-trihydroxybenzophenone;
2,2',4,4'-tetrahydroxybenzophenone;
2,2'-dimethoxy-4,4'-dihydroxybenzophenone;
hydroxybenzyl alcohol;
α,ω-dihydroxypolyphenylene ether ketones; e.g.

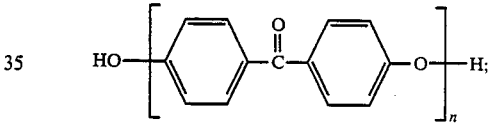

αω-dihydroxypolyalkylene ether ketones (alkyleneis C1 to C6),
4,4'-dihydroxystilbene;
3,3'-dichloro-4,4'-dihydroxystilbene;
3,3'-dimethyl-4,4'-dihydroxystilbene;
3,3',5,5'-tetramethyl-4,4'-dihydroxystilbene;
3,5-dihydroxystilbene;
α,ω-dihydroxypolyphenylene ether sulphones;
α,ω-dihydroxypolyalkylene ether sulphones; (alkylene is C1 to C6);
1,2-dihydroxyethane;
1,3-dihydroxypropane;
1,2-dihydroxypropane;
1,4-dihydroxybutane;
1,4-dihydroxybut-2ene;
dihydroxycyclohexanes;
1,4-dihydroxy-2-chlorobutane;
triethylene glycol;
α,ω-dihydroxypolytetrahydrofuran;
e.g. TeracolR 600, 1000 or 2000 from Du Pont;
α,ω-dihydroxy polysiloxane;
α,ω-bis(4-hydroxyphenyl)polysiloxane;
dihydroxystyrene;
1,2-dihydroxyacenaphthene;
dihydroxyacridine;
dihydroxyanthracene;
1,1'-dihydroxy-2,2'-binaphthyl, and isomers;
dihyroxycarbazole;
dihydroxychrysene;
dihydroxybibenzofuran;

dihydroxy-1,7-dimethylphenanthrene;
dihydroxy-2,3-dinitronaphthalene;
dihydroxydiphenylsulphide;
3,3'-dihydroxyleprotene;
dihyroxynitroazobenzene;
dihydroxyperylene;
dihydroxyphenazine;
dihydroxypyrene;
dihydroxy-1,2,3,4-tetrahydroanthracene;
dihydroxy-3',4',5,7-tetramethoxyflavone;
dihydroxy-5-undecyclbenzene;
5,7 dihydroxycoumarin;
6,7 dihydroxycoumarin;
α,ω-dihydroxypolyesters;

azobenzene dicarboxylic acid dichloride;
benzophenone dicarboxylic acid dichloride;
diphenyl sulphone dicarboxylic acid dichloride;
biphenyl dicarboxylic acid dichloride;
tetrafluoro-1,4-benzene dicarboxylic acid dichloride;
anthracene dicarboxylic acid dichloride;
4,4'-isopropylidene di(benzoyl chloride);
oxalic acid dichloride;
1,4-bis(chloroformyl)benzene quinoline dicarboxylic acid dichloride;
polyester-α,ω-dicarboxylic acid dichloride;
polyaryletherketone-α,ω-dicarboxylic acid dichloride;
polyarylethersulphone -α,ω- dicarboxylic acid dichloride;

e.g.

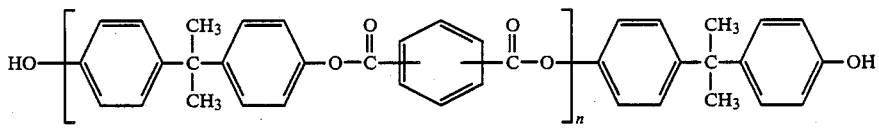

or,

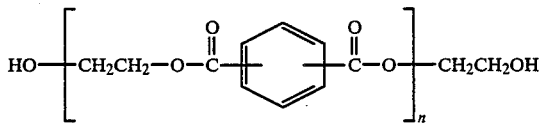

α,ω-dihydroxypolyamides;
α,ω-dihydroxypolycarbonates
α,ω-dihydroxypolyurethanes;
4,4'-biphenyldithiol;
4,4'-biphenyletherdithiol;
2,2'-bis(4-phenylenethiol)propane:
4-mercapto-1-anthracenol;
3,4-toluenedithiol;
1,4-phenylenedithiol;
1,6-hexanedithiol;
4-hydroxythiophenol;
N,N'-Diacetyl-1,4-diaminobenzene;
4,4'-diaminobiphenyl;
1,4-diaminobenzene;
1,3-diaminobenzene;
4,4'-diaminodiphenylether;
4,4'-diaminodiphenylsulphone;
Examples of the electrophilic reactant (V) incorporating the A2 moiety are as follows:
1,4-benzene-dicarboxylic acid dichloride;
1,3-benzene-dicarboxylic acid dichloride;
1,2-benzene-dicarboxylic acid dichloride;
mono-, di-, tri- and tetra- alkyl substituted benzene dicarboxylic acid dichlorides;
mono-,di-, tri- and tetra- aryl substituted benzene dicarboxylic acid dichlorides;
mono-, di-, tri- and tetra halogenated benzene dicarboxylic acid dichlorides;
mono-, and di- nitro substituted benzene dicarboxylic acid dichlorides;
5-nitro-1,3-benzene dicarboxylic acid dichloride;
5-maleimido-1,3-benzene dicarboxylic acid dichloride;
pyridine dicarboxylic acid dichloride;
5-methyl-1,3-benzene dicarboxylic acid dichloride;
diphenylether dicarboxylic acid dichloride;
5-phenyl-1,3-benzene dicarboxylic acid dichloride;
naphthalene dicarboxylic acid dichloride;
stilbene dicarboxylic acid dichloride;

polyarylethersulphone -α,ω- disulphonic acid dichloride;
polyamide - α,ω- dicarboxylic acid dichloride;
polycarbonate dicarboxylic acid dichloride;
cyclohexane dicarboxylic acid dichloride;
adipic acid dichloride;
1,2 ethylene dicarboxylic acid dichloride;
malonic acid dichloride;
succinic acid dichloride;
chlorosuccinic acid dichloride;
maleic acid dichloride;
dibromomaleic acid dichloride;
diethylmaleic acid dichloride;
fumaric acid dichloride;
glutaric acid dichloride;
hexafluoroglutaric acid dichloride and other fluorinated aliphatic/aromatic carboxylic acid dichlorides;
itaconic acid dichloride;
mesaconic dichloride;
muconic dichloride;
cis-5-norbornene-endo-2,3-di(carboxylic acid dichloride);
phenylene di(acetic acid) dichloride;
sebacic acid dichloride;
tetrahydrofuran dicarboxylic acid dichloride;
undecane dicarboxylic acid dichloride;
2,2'-bis(4-chloroformylphenyl)propane;
phenyl phosphonic acid dichloride;
diphenylether disulphonic acid dichlorde;
polycarbonate-α,ω-bischloroformate;
oxaloyl chloride
dichlorodimethylsilane;
dichlorodiphenylsilane;
dichloromethylphenylsilane;
dichlorotetramethyldisiloxane;
α,ω dichloro polydimethylsiloxane;
α,ω dichloro polymethylphenylsiloxane:
dichloracetylene;

1,4-dichlorobutadiene;
α,ω-dichloropolyphosphazene;
polydiorganosiloxane- α,ω-(p-phenylenedicarboxylic acid dichloride).

Thus, for example, a polyester is prepared by reacting a diol of formula IX with a reagent of formula VII or VIII to form a nucleophilic reactant I. This nucleophilic reactant is then polymerized with an electrophilic reactant V to yield a polyester. By way of specific illustration, the diol hydroquinone is reacted with either bis-tri-n-butyltin oxide or tri-n-butyltin methoxide to form a nucleophilic reactant of the structure

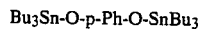
Bu₃Sn-O-p-Ph-O-SnBu₃

This is then reacted with terephthaloyl chloride as an electrophilic reactant, to produce the polyester having the repeat unit.

[-O-p-Ph-O-CO-p-Ph-CO-]

Analogously, a polyamide is prepared by reacting a diamine of formula IX with a reagent of formula VII or VIII to form a nucleophilic reactant I. This first reactant is then polymerized with an electrophilic reactant V to yield a polyamide. By way of specific illustration, the diamine p-phenylenediamine is reacted with either bis-tri-n-butyltin oxide or tri-n-butyltin methoxide to form a nucleophilic reactant of the structure.

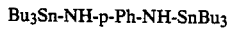
Bu₃Sn-NH-p-Ph-NH-SnBu₃

This is then reacted with isophthaloyl chloride as the electrophilic reactant to produce the polyamide having the repeat unit -NH-p-Ph-NH-CO-m-Ph-COwhere m-Ph is m-phenylene.

Random copolymers can be prepared by using more than a single compound IX to form the nucleophilic reactant I, or by using more than a single electrophilic reactant V, or both. By way of specific illustration, in the preparation of the polyamide set forth immediately above, a random copolyamide is produced if, instead of using only p-phenylenediamine, a mixture of m- and p-phenylenediamines is used. Alternatively, a mixture of iso- and terephthaloyl chlorides can be used.

It is to be recognized that the degree of randomness can be affected by the relative reactivities of the comonomers and the sequence and timing of their addition. These parameters can be utilized to increase or decrease the degree of randomness, as desired. For example, if a mixture of nucleophilic reactants in which one comonomer is more reactive is used, it may react substantially before the other one, leading to a more "blocky" copolymer.

Block copolymers are prepared according to the method of this invention by reacting a precursor polymer

H—Y—P—Y—H    (XII)

with a reagent VII or VIII to produce a first polymer block (R')ᵦM—Y—P—Y—M(R')ᵦ    (XIII)

This first polymer block is then reacted with a second polymer block of the formula

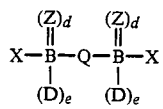
(XIV)

to produce a block copolymer having the repeating blocks of the formula

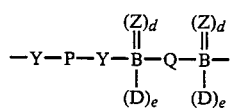
(XV)

In formula XIII, R', b, M, and Y are as hereinbefore defined. H is hydrogen. P is a divalent polyolefin, polyester, polyamide, polyphenylene ether ketone, polyalkylene ether ketone, polytetrahydrofurane, polydimethylsiloxane, polymethylphenylsiloxane, polyphenylene ether sulfone, polyalkylene ether sulfone, polycarbonate, or polyurethane polymeric group. Further examples of suitable groups P can be found in the following illustrative but not exclusive list of suitable precursor polymers H—Y—P—Y—H:

α,ω-dihydroxypolyphenylene ether ketones; e.g.

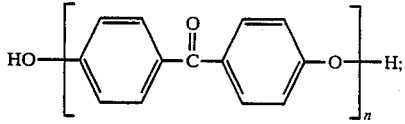

α,ω-dihydroxypolyalkylene ether ketones (alkylene is C₁ to C₆;
αω-dihydroxypolytetrahydrofuran; e.g. Teracol® 600, 1000 or 2000 from Du Pont;
α,ω-dihydroxy polysiloxane;
α,ω-bis(4-hydroxyphenyl)polysiloxane;
α,ω-dihydroxypolyphenylene ether sulphones;
α,ω-dihydroxypolyalkylene ether sulphones; (alkylene is C₁ to C₆);
α,ω-dihydroxypolyesters; e.g.

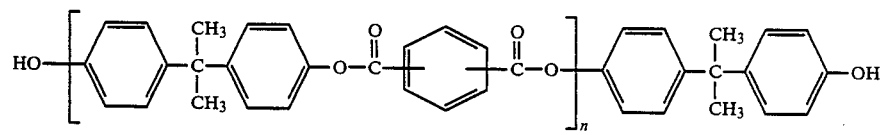

or

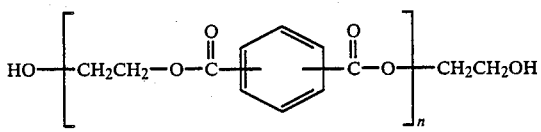

α,ω-dihydroxypolyamides;
α,ω-dihydroxypolycarbonates; and
α,ω-dihydroxypolyurethanes;

In formula XIV, X, Z, d, B, D, and e are as hereinbefore defined. Q is a divalent polyester, polyamide, polyphenylene ether ketone, polyphenylene ether sulfone, polycarbonate, polydimethylsiloxane, or ploymethyl phenyl-siloxane polymeric group. Further examples of suitable groups Q can be found in the following illustrative but not exclusive list of suitable second polymer blocks XIV:

polyester-α,ω-dicarboxylic acid dichloride;
polyaryletherketone-α,ω-dicarboxylic acid dichloride;
polyarylethersulphone-α,ω-dicarboxylic acid dichloride;
polyarylethersulphone-α,ω-disulphonic acid dichloride;
polyamide-α,ω-dicarboxylic acid dichloride;
polycarbonate-α,ω-dicarboxylic acid dichloride;
α,ω-dichloro polydimethylsiloxane;
α,ω-dichloro polymethylphenylsiloxane;
α,ω-dichloropolyphosphazene; and polydiorganosiloxane-α,ω-(p-phenylene dicarboxylic acid dichloride).

By way of specific illustration of the preparation of a block copolymer, the first polymer block

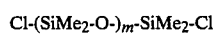
Bu$_3$Sn-O-(p-Ph-CO-p-Ph-O)$_n$-SnBu$_3$ where n is an integer greater than 1, is block copolymerized with the second polymer block

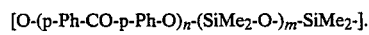
Cl-(SiMe$_2$-O-)$_m$-SiMe$_2$-Cl where m is an integer greater than 1, to produce a block copolymer having the repeating blocks

[O-(p-Ph-CO-p-Ph-O)$_n$-(SiMe$_2$-O-)$_m$-SiMe$_2$-].

In a preferred embodiment of the invention, the first polymer block XIII is prepared by reacting a stoichiometric excess of a nucleophilic reactant

(R')$_b$M-Y-A$_1$-Y-M(R')$_b$ where R', b, M, Y, and A$^1$ are as hereinbefore defined, with an electrophilic reactant (i), (ii), or (iii), as hereinbefore defined. In another preferred embodiment of the invention, the second polymer block is prepared by reacting the nucleophilic reactant with a stoichiometric excess of the electrophilic reactant (i), (ii), or (iii). In yet another preferred embodiment of the invention, both the first and second polymer blocks are prepared as mentioned immediately above. In summary, using an excess of the nucleophilic reactant produces a first polymer block XIII, while using an excess of the electrophilic reactant produces a second polymer block XIV.

In a particularly advantageous embodiment, each of he blocks XIII and XIV is prepared by the above-described stoichiometric imbalance method, then the blocks are mixed and block copolymerized without the prior isolation each block. In such an embodiment, the solvent used for the preparation of each of blocks XIII and XIV can be the same or different.

Those skilled in the art will appreciate that the size of the first and second polymer blocks can be controlled by varying the degree of stoichiometric imbalance.

By way of specific illustration, a first block

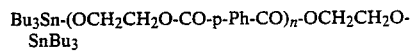
Bu$_3$Sn-(OCH$_2$CH$_2$O-CO-p-Ph-CO)$_n$-OCH$_2$CH$_2$O-SnBu$_3$ where n is an integer greater than 1, can be prepared from ethylene glycol and terephthaloyl chloride, using an excess of the former. A second block

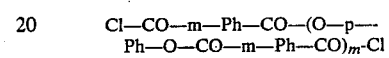
Cl—CO—m—Ph—CO—(O—p—Ph—O—CO—m—Ph—CO)$_m$-Cl where m is an integer greater than 1, can be prepared from hydroquinone and isophthaloyl chloride, using an excess of the latter. These two blocks can be block copolymerized to produce the block copolyester having the repeating blocks

[—(OCH$_2$CH$_2$O—CO—p—Ph—CO)$_n$—]

and

[—CO—(O—p—Ph—O—CO—m—Ph—CO)$_m$—].

It will also be evident to those skilled in the art that if one of the end groups (R')$_b$M— in the first polymer block XIII and one of the end groups

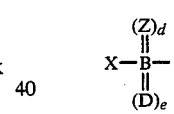

in the second block XIV are replaced by inert groups F and F', respectively, then a diblock copolymer having the formula

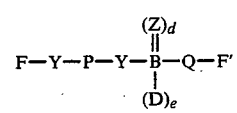

is produced. If only the first polymer block XIII has an end group replaced by an inert group F, a block copolymer with the formula

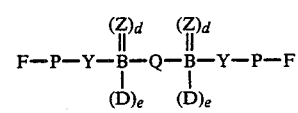

is produced, and vice-versa.

In addition to the new polymers and copolymers specifically described, some new classes of copolymers have been discovered.

A first class is a block copolymer comprising at least one non-ethylenically unsaturated aromatic polymer block and at least one ethylenically unsaturated polymer block.

A second class of block copolymers is a block copolymer containing at least one wholly aromatic polymer block of the formula:

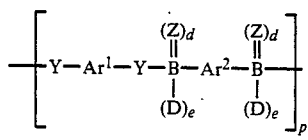

where

Y,B,Z,D,B,d and e are as defined above;

Ar¹ and Ar² are each independently a monomeric, oligomeric or polymeric aromatic moiety which at least bifunctional; and p is an integer greater than 1.

Preferably the polymer block (XII) is a polyester, and more preferably contains a bisphenol residu. A number of different polymer blocks can be copolymerised w the polymer block (XII).

An example of a copolymer comprising a polyester block and an ethylenically unsaturated block is a copolymer of the formula:

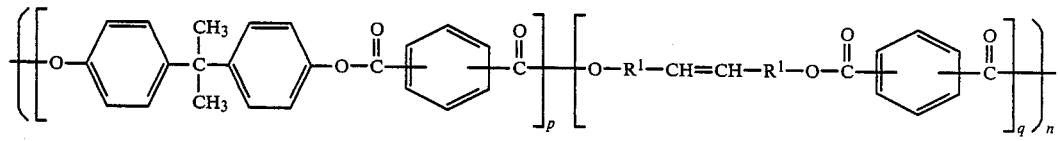

where
each $R^1$ is independently a substituted or unsubstituted aromatic or aliphatic group which is at least bifunctional, and is preferably a methylene of substituted or unsubstituted phenylene group, q and n are each independently an integer greater than or equal to 1; and p is an integer greater than 1.

An amide block can also be copolymerised with the polymer block (XII). An example is a copolyesteramide of the formula:

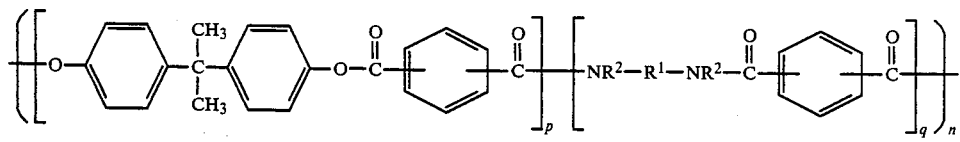

where

R,p,q and n are as defined above; and each R' is independently a substituted or unsubstituted alkyl or aryl group or a hydrogen atom, and is preferably a substituted or unsubstituted phenylene group.

Another type of block copolymer containing a polymer block of formula (XII) is one comprising a polyester block and a polyether-containing block. For example:

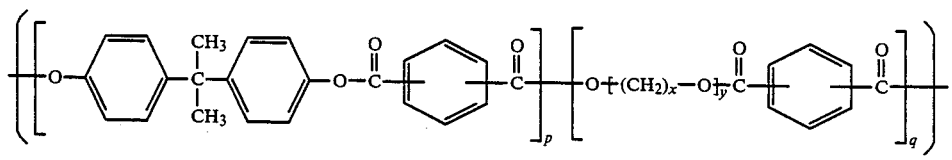

where p, q and n are as defined above;

x is an integer greater than 1; and y is an integer greater than or equal to 1.

Specific details of the invention are illustrated by the following examples. All solvents and materials mentioned in the examples are degassed, especially to exclude carbon dioxide, prior to their use.

EXAMPLE 1

This example describes the preparation of a copolyester having the repeat unit

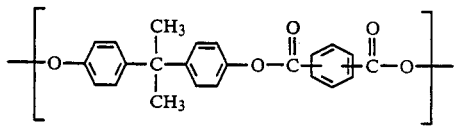

A mixture of 97.82 grams (0.43 mol) 2,2'-bis(4-hydroxyphenyl)propane, 255.41 grams (0.43 mol) of bis-(tri-n-butyl tin) oxide and 500 ml of xylene were heated under reflux in a nitrogen atmosphere for 4 hours. A Dean-Stark trap was used to remove the water formed during the reaction. Thereafter 300 ml of the xylene was removed at atmospheric pressure and the remaining 200 ml at reduced pressure (20 mm/Hg). After allowing the remaining liquid to cool to room temperature 150 ml of dry chloroform was added to the liquid. To this solution was then added 43.76 grams (0.215 mol) isophthalyoyl dichloride in 100 ml of dry chloroform. After a period of not less than 20 minutes 43.76 grams (0.215 mol) of terephthaloyl dichloride in 100 ml of chloroform was added. Reflux (70° C.) was maintained for 20 hours. The viscous cloudy solution was poured into two liters of methanol in a Waring blender and the precipitate collected by filtration. Residual tri-n-butyl tin chloride was removed by continuous extraction for sixteen hours with methanol.

¹³C n.m.r., infra-red, and ¹H n.m.r. spectra were consistent with the expected structure and matched those of the commercial polymer "Arylef" (trade name-from Solvay), which is a random copolymer of the same monomers. The Reduced Viscosities (RV) of the polymer of the example and of "Arylef", and the molecular weights by GPC and expressed in Polystyrene equivalents were similar. The Dynamic Mechanical Analysis was also similar although not precisely the same. Some results and comparisons are shown in Table 1.

TABLE 1

|  | Experimental Sample | Arylef |
|---|---|---|
| Mn* | 31,3000 | 30,400 |
| Tg | 185° C. | 188° C. |
| Ts** | 238° C. | 241° C. |
| RV*** | 0.73 | 0.72 |

*G.P.C. in chloroform solution, polystyrene equivalents.
**Softening point
***1% solution in chloroform A similar result is obtained if the entire reaction is carried out in chlorobenzene.

EXAMPLE 2

Preparation of the polyester

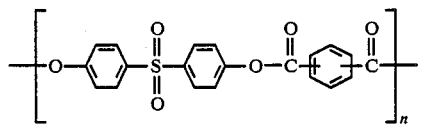

A mixture of 20.05 grams (0.08 mol) of bis(4-hydroxyphenyl)sulphone, 47.75 grams (0.08 mol) of bis-(tri-n-butyl tin) oxide and 500 ml of xylene were heated under reflux in a nitrogen atmosphere for 3 hours. A Dean-Stark trap was used to remove the water formed during the reaction. Thereafter 300 ml of the xylene was removed at atmosphoric pressure and the remaining 200 ml at reduced pressure (20 mm/Hg). After allowing the remaining liquid to cool to room temperature, when it may crystallize under certain conditions, 50 ml of dry chloroform was added to the remaining liquid. To this solution was added 8.13 grams (0.04 mol) isophthaloyl dichloride in 50 ml of dry chloroform. After a period of not less than twenty minutes 8.13 grams (0.04 mol) of terephthaloyl dichloride in 50 ml of dry chloroform was added. Reflux (70° C.) was maintained for 20 hours. The viscous cloudy solution was poured into one liter of methanol and the precipitate collected by filtration. Residual tri-n-butyl tin chloride was removed be extraction with methanol for 8 hours.

The structure of the resulting polysulphone ester was confirmed by $^{13}C$ n.m.r. spectroscopy and infra-red spectrophotometry.

The polymer had a reduced viscosity of 0.37 dl/g (1% solution in chloroform).

EXAMPLE 3

Preparation of the polycarbonate

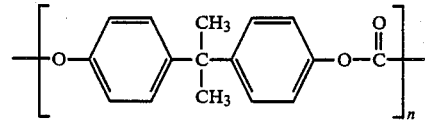

A mixture of 100.32 grams (0.44 mol) of 2,2'-bis (4-hydroxy phenyl)propane, 282.54 grams (0.88 mol) of tributyltin methoxide and 700 ml of chlorobenzene were heated under reflux. Methanol was removed as the by-product using a fractionating column. Upon completion the solution of stannylated bisphenol was allowed to cool to room temperature. After cooling, 43.47 grams (0.44 mol) of phosgene gas was slowly passed into the solution. After the addition was complete the solution was stirred at room temperature for 2 hours and then at 70° C. for 10 hours. The viscous solution was poured into 2 liters of methanol in a Waring blender. The precipitate was collected by filtration. Residual tri-n-butyl tin chloride was removed by continuous extraction for 16 hours with methanol.

The structure of the resulting "Bisphenol A" polycarbonate ("Bisphenol A" is a trade name) was confirmed by $^{13}C$ n.m.r. spectroscopy and infra-red spectrophotometry.

The polymer had a reduced viscosity of 0.72 dl/g. (1% solution in chloroform).

EXAMPLE 4

Preparation of the polycarbonate

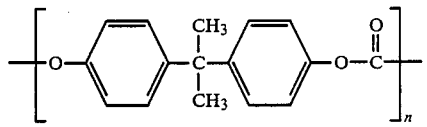

A mixture of 26.27 grams (0.115 mol) 2,2'-bis(4hydroxyphenyl)propane, 68.60 grams (0.115 mol) bis-tri-n-butyl tin) oxide and 600 ml of xylene were heated under reflux in a nitrogen atmosphere for 4 hours. A Dean-Stark trap was used to remove the water formed during the reaction. Thereafter 350 ml of xylene was removed at atomspheric pressure and the remaining 250 ml under reduced pressure (20 mm/Hg). After allowing the remaining liquid to cool to room temperature 50 ml of dry chloroform was added. To this solution was added 40.65 grams (0.115 mol) 2,2'-bis(4-chloroformylphenyl)propane in 100 ml of dry chloroform. Reflux (70° C.) was maintained for 20 hours. The viscous cloudy solution was poured into one liter of methanol in a Waring blender. The precipitate was collected by filtration. Residual tri-n-butyl tin chloride was removed by continuous extraction for 16 hours with methanol.

The structure of the resulting "Bisphenol A" polycarbonate was confirmed by $^{13}C$ n.m.r. spectroscopy and infra-red spectrophotometry.

EXAMPLE 5

This example describes the preparation of a copolyester having the repeat units

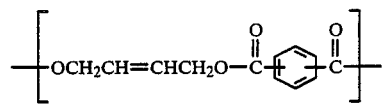

and

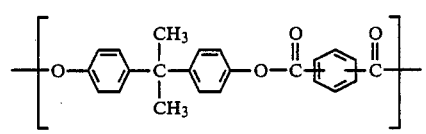

A mixture of 3.52 grams (0.04 mol) of 1,4-but-2-enediol, 81.00 grams (0.36 mol) of 2,2'-bis(4-hydroxphenyl)propane, 256.86 grams (0.8 mol) of tributyltin methoxide and 600 ml of chlorobenzene were heated to reflux in a nitrogen atmosphere. Methanol was removed as the by-product using a fractionating column. Upon completion, the mixture of stannylated bisphenol and glycol was allowed to cool for 80° C.

To this solution was then added a mixture of 40.07 grams (0.2 mol) of isophthaloyl dichloride and 40.07 grams (0.2 mol) of terephthaloyl dichloride in 100 ml of dry chlorobenzene. The reaction mixture was then refluxed for 10 hours. The viscous cloudy solution was poured into two liters of methanol in a Waring Blender and the precipitate collected by filtration. Residual tri-n-butyl tin chloride was removed by continuous extraction for sixteen hours with methanol.

The structure of the polyester was confirmed by $^{13}$C n.m.r. spectroscopy and by infra-red spectrophotometry. The polymer had a reduced viscosity of 1.04 dl/g. (1% solution in chloroform).

EXAMPLE 6

This example describes preparation of the copolyester having the repeat unit

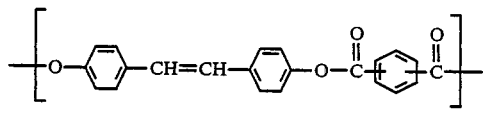

and

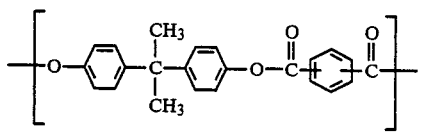

A mixture of 6.36 grams (0.028 mol) of 2,2'-bis (4-hydroxyphenyl)propane, 6.12 grams (0.032 mol) of 4,4'dihydroxystilbene, 33.78 grams (0.06 mol) of bis-(tri-n-butyl tin) oxide and 150 ml of chlorobenzene were heated under reflux for two hours. A Dean-Stark trap was used to remove the water formed during the reaction. Thereafter 75 ml of the chlorobenzene was removed at atmospheric pressure. To this solution was then added 5.75 grams (0.03 mol) of isophthaloyl dichloride in 25 ml dry chlorobenzene. After a period of not less than twenty minutes 5.75 grams (0.03 mol) of terephthaloyl dichloride in 25 ml of dry chlorobenzene was added. Reflux was maintained for 20 hours. The viscous cloudy solution was poured into 250 ml of methanol in a Waring blender and the precipitate collected by filtration. Residual tri-n-butyl tin chloride was removed by continuous extraction for sixteen hours with methanol.

Infra-red data was consistent with the structure proposed. The polymer had a reduced viscosity of 0.79 dl/g. (1% solution in chloroform).

Copolyesters from "Bisphenol A" and 3,3'-dichloro-4,4'-dihydroxystilbene, "Bisphenol A" and 2,2',3,3'-tetramethyl-4,4'-dihydroxystilbene, and "Bisphenol A" and 4,4-di(hydroxy)benzalazine were prepared in an analogous manner.

EXAMPLE 7

Preparation of the polythioester

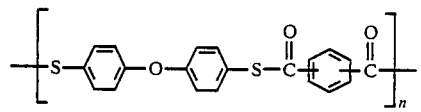

4,4'-dithiol, 18.41 grams (0.031 mol) of bis(tri-n-butyl tin)oxide and 150 ml of xylene were heated under reflux in a nitrogen atmosphere for two hours. A Dean-Stark trap was used to remove the water formed during the reaction. Thereafter 75 ml of the xylene was removed at atmospheric pressure and the remaining 75 ml at reduced pressure (20 mm H/g). After allowing the remaining 75 ml liquid to cool to room temperature 30 ml of dry chloroform was added. To this solution was added 3.134 grams (0.015 mol) isophthaloyl dichloride in 25 ml of dry chloroform. After a period of not less than twenty minutes 3.134 grams (0.015 mol) of terephthaloyl dichloride in 25 ml of dry chlorofomm was added. Reflux (70° C.) was maintained for 20 hours. The cloudy suspension was poured into 250 ml of methanol in a Waring blending and the precipitate collected by filtration. Residual tri-n-butyl tin chloride was removed by continuous extraction for sixteen hours with methanol.

Infra-red spectrophotometric data was consistent with the structure proposed.

EXAMPLE 8

Preparation of the polyester

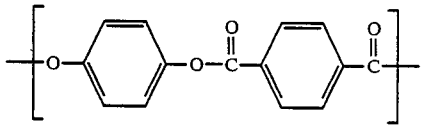

A mixture of 9.236 grams 0.084 mol) of hydroquinone, 50 grams (0.084 mol) of bis(tri-n-butyl tin) three hours. A Dean-Stark trap was used to remove the water formed during the reaction. Thereafter 100 ml of the xylene was removed at atmospheric pressure and the remaining 100 ml at reduced pressure (20 mm/Hg). After allowing the remaining liquid to cool to room temperature 100 ml of dry chloroform was added. To this solution was then added 17.029 grams (0.084 mol) of terephthaloyl dichloride in 50 ml of dry chloroform. Reflux (70° C.) was maintained for 20 hours. The resulting cloudy suspension was poured into 250 ml of methanol in a Waring blender and the precipitate collected by filtration.

Infra-red spectrophotometric data was consistent with the structure proposed.

EXAMPLE 9

Preparation of the polyphosphonic ester

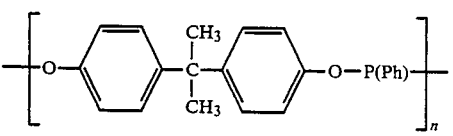

A mixture of 49.42 grams (0.22 mol) of 2,2'-bis(4-hydroxyphenyl)propane, 129.04 grams (0.22 mol) of bis(tri-n-butyl tin)oxide and 300 ml of xylene were heated under reflux in a nitrogen atmosphere for 4 hours. A Dean-Stark trap was used to remove the water formed during the reaction. Thereafter 200 ml of the xylene was removed at atmospheric pressure and the remaining 100 ml under reduced pressure (20 ml H/g). After allowing the remaining liquid to cool to room temperature 100 ml of dry chloroform was added. To this solution was slowly added 42.89 grams (0.22 mol) of phenylphosphonic acid dichloride in 100 ml of dry chloroform. Reflux (70° C.) was maintained for 20 hours. The clear viscous solution was poured into one liter of hexane in a Waring blender and the precipitate collected by filtration.

Infra-red spectrophotometric data was consistent with the structure proposed. The polymer had a reduced viscosity of 0.55 dl/g. (1% solution in chloroform).

EXAMPLE 10

Preparation of the polyester

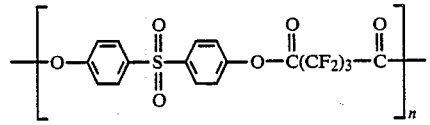

A mixture of 14.90 grams (0.06 mol) of bis(4-hydroxyphenyl)sulphone, 35.49 grams (0.06 mol) of bis(tri-n-butyl tin)oxide and 400 ml of xylene were heated under reflux for four hours. A Dean-Stark trap was used to remove the water formed in the reaction. Thereafter 200 ml of the xylene was removed at reduced pressure (20 mm/Hg). After allowing the remaining liquid to cool to room temperature 50 ml of dry chloroform was added. To this solution was slowly added 16.49 grams (0.06 mol) of hexafluoroglutaroyl dichloride in 150 ml of chloroform. Reflux (70° C.) was maintained for 20 hours. The cloudy suspension was poured into 500 ml of methanol in a Waring blender and the precipitate collected by filtration. Residual tri-n-butyl tin chloride was removed by continuous extraction for sixteen hours with hexane.

Infra-red spectrophotometric data was consistent with the structure proposed. The polymer

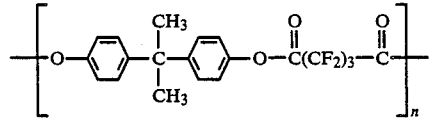

was prepared by a similar method.

EXAMPLE 11

Preparation of the polyamide

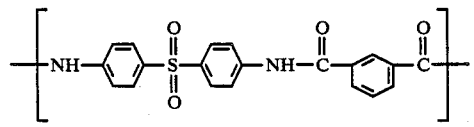

A mixture of 16.88 grams (0.046 mol) of diethylaminotri-n-butyl stannane, 5.79 grams (0.023 mol) of 4,4'-diaminodiphenylsulphone and 25 ml of dry chlorobenzene were stirred at room temperature for 2 hours and then refluxed for 1 hour during which time diethylamine was removed. After allowing the solution to cool to room temperature 4.74 grams (0.023 mol) of isophthaloyl dichloride in 25 ml of chlorobenzene was added. The reaction was then refluxed (70° C.) for 17 hours at 100° C. After cooling the reaction mixture was poured into methanol in a Waring blender and the precipitate collected by filtration. Residual tri-n-butyl tin chloride was removed be continuous extraction for 16 hours with methanol $^{13}$C n.m.r. spectroscopic and infra-red spectrophotometric data were consistent with the proposed structure of the polyamide.

EXAMPLE 12

This example describes the preparation of the block copolyesteramide having blocks.

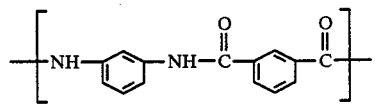

and

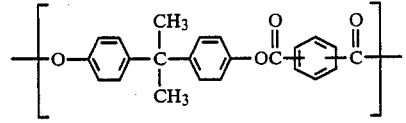

Using the procedure outlined in Example 1 a polyester was prepared from 30.75 grams (0.135 mol) of 2,2-bis(4-hydroxyphenyl)propane, 80.30 grams (0.135 mol) of bis(tri-n-butyl tin)oxide, 12.14 grams (0.06 mol) of isophthaloyl dichloride and 12.17 grams (0.06 mol) of terephthaloyl dichloride. An excess of the tin compound was used to ensure that the resulting polyester was terminated at each end with a tri-n-butyl tin group.

Simultaneously but in a separate flask a polyamide was prepared using 54.97 grams (0.219 mol) of N,N'-bis (trimethylsilyl)-m-phenylenediamine and 47.42 grams (0.23 mol) of isophthaloyl dichloride. An excess of the dichloride compound was used to ensure that the resulting polyamide was terminated at each end with a chloride group. During the reaction trimethyl chlorosilane by product was removed. Upon completion of reaction a vacuum was applied (50 mm/Hg) to ensure removal of last traces of Me$_3$SiCl.

The ester solution was then added to the amide solution. After the addition was complete the chloroform was distilled out. The remainder was heated to 70° C. for 20 hours. The resulting viscous cloudy mixture was poured into one liter of methanol and the precipitate collected by filtration. Residual tri-n-butyl tin chloride was removed by continuous extraction of the solid for 16 hours using methanol.

Infra-red spectrophotometric data was consistent with the proposed structure. Upon extraction with solvents for the respective homopolymers no change was observed in the infra-red spectrum of the copolymer.

EXAMPLE 13

Preparation of the polyester

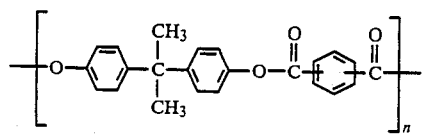

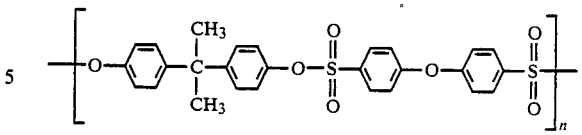

A mixture of 32.48 grams (0.14 mol) of 2,2-bis(4-hydroxyphenyl)propane, 91.37 (0.28 mol) grams of methoxytri-n-butyl tin and 400 ml of distilled chlorobenzene were heated to reflux. Methanol was removed as the byproduct, using a fractionating column. In all 9.10 ml of methanol was removed along with 150 ml of solvent over 4.5 hours. The solution of stannylated 2,2-bis(4-hydroxyphenyl)propane was allowed to cool to 80° C. whereupon a solution of 14.44 (0.07 mol) grams of terephthaloyl dichloride and 14.44 grams (0.07 mol) of isophthaloyl dichloride in 100 ml of chlorobenzene was added over 1 minute. The reaction mixture was brought to reflux and maintained for 1 hour. Then sufficient solvent was removed from the reaction to maintain a reaction temperature of 140° C. This temperature was maintained for 10 hours. After allowing to cool to 80° C. the polymer was precipitated by pouring the viscous solution into 1 liter of hexane in a Waring blender. The polymer was collected by filtration and final traces of tri-n-butyl tin chloride by-product removed by continuous extraction of the product with methanol for 8 hours.

The structure of the polyester was confirmed by $^{13}$C N.M.R. spectrocopy and by I.R. spectrophotometry. The RV in chloroform of a 0.5% solution was 0.87.

EXAMPLE 14

Preparation of the polyoxylate

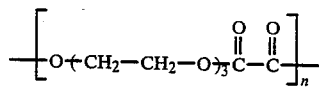

A mixture of 49.50 grams (0.3296 mol) of triethylene glycol, 211.65g (0.6592 mol) of tributyltin methoxide and 300 mls of dry chlorobenzene were heated to reflux. Methanol was removed as the by-product using a fractionating column. After all the methanol had been removed, a further 75 mls of chlorobenzene was removed to ensure its complete removal. The solution of stannylated glycol was cooled to 0° C. and to this solution was added 41.84 grams (0.3296 mol) of oxalyol chloride in 100 mls of chlorobenzene. The reaction was very exothermic. After the addition was complete the addition funnel was washed through with 3×10 mls of chlorobenzene. The semi-viscous solution was left stirring at room temperature overnight.

The two layers were then separated and the product layer, the viscous one, was washed with 5×150 ml of diethylether. Residual ether was then removed under vacuum leaving a pale yellow highly viscous oil which slowly solidified over 2 weeks.

The structure of the polymer was confirmed by $^1$H n.m.r. spectroscopy and infra-red spectrophotometry.

G.P.C. chromatographic analysis of the material gave it an Mn=7000 polystyrene equivalents.

EXAMPLE 15

Preparation of the polysulphonate ester

A mixture of 28.41 grams (0.1244 mol) of 2,2'-bis (4-hydroxyphenyl) propane, 79.93 g (0.2489 mol) of tributyltin methoxide and 300 mls of dry chlorobenzene were heated to reflux. Methanol was removed as the by-product using a fractionating column. After all the methanol had been removed a further 100 mls was removed to ensure its complete removal. The stannylated bisphenol was allowed to cool to 90° C. To this solution was then added 45.70 g (0.1245 mol) of diphenyl ether-4,4'-di(sulphonyl chloride) in 100 mls of dry chlorobenzene. After refluxing for 10 hours the polymer was precipitated by pouring into methanol in a Waring blender. After filtration the tributyltin chloride residues were extracted into diethyl ether.

The structure of the polymer was confirmed by $^1$H n.m.r. spectroscopy and infra-red spectrophotometry.

The polymer had a reduced viscosity of 0.87 dl/g. (1% solution in chloroform).

EXAMPLE 16

Preparation of the copolyester having the repeat units

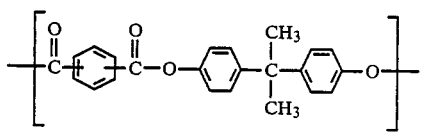

and

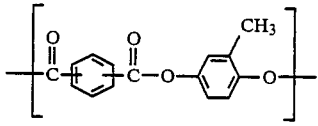

A mixture of 23.40 grams (0.1025 mol) of 2,2'-bis (4-hydroxyphenyl) propane, 12.72 grams (0.1025 mol) of methyl hydroquinone, 131.66 grams (0.4101 mol) of tributyltin methoxide and 400 mls of dry chlorobenzene were heated to reflux. Methanol was removed as the by-product using a fractionating column. After all the methanol had been removed a further 75 mls of chlorobenzene was removed to ensure its complete removal. The stannylated mixture of bisphenols was allowed to cool to 90° C. To this solution was then added a mixture containing 20.81 grams (0.1025 mol) of isophthaloyl dichloride and 20.81 grams (0.1025 mol) of terephthaloyl dichloride in 200 mls of chlorobenzene. After refluxing for 10 hours the viscous mass was poured into 1 liter of methanol. The precipitated polymer was transferred to a Waring blender with more methanol and broken up. The fiberous polymer was collected by filtration and the tributyltin residues extruded into methanol overnight.

The structure of the polymer was confirmed by $^1$H n.m.r. spectroscopy and infra-red spectrophotometry.

The polymer had a reduced viscosity of 1.83 dl/g. (1% solution in o-chlorophenol.

EXAMPLE 17

Preparation of the polyester

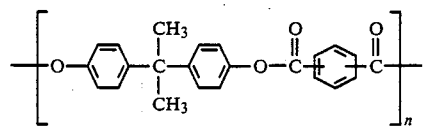

A mixture of 9.06 grams (0.0397 mol), 19.80 g grams (0.0397 mol) of thallous ethoxide and 50 ml of dry chlorobenzene was brought up to reflux. Ethanol was removed as the by-product using a fractionating column. After all the ethanol had been removed a further 10 mls of chlorobenzene was removed to ensure its complete removal. The thallous bisphenate was allowed to cool to 80° C. To the cooled mixture was added a mixture of 4.03 grams (0.0198 mol) of iso-phthaloyl dichloride and 4.03 grams (0.0198 mol) of terephthaloyl dichloride in 150 mls of dry chlorobenzene. After refluxing for 10 hours the white mass was poured into methanol. The polymer was extracted from the thallous chloride by-product by dissolving the polymer in chloroform, filtering and re-precipitating in methanol.

The structure of the polyester was confirmed by 'H n.m.r. spectroscopy and infra-red spectrophotometry.

The polymer had a reduced viscosity of 0.46 dl/g. (1% solution in chloroform).

EXAMPLE 18

Preparation of the polyester having the repeat units

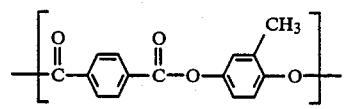

and

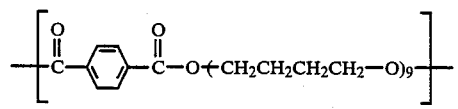

A mixture of 8.21 grams (0.066 mol) of methylhydroquinone, 10.93 grams (0.016 mol) of Teracol 650 (tradename from Du Pont), 53.00 grams (0.165 mol) of tributyltin methoxide and 150 mls of dry chlorobenzene were heated to reflux. Methanol was removed as the by-product using a fractionating column. After all the methanol had been removed a further 25 mls of chlorobenzene was removed to ensure its complete removal. The stannylated mixture was then allowed to cool to room temperature. To the cold solution was then added 16.58 grams (0.082 mol) of terephthaloyl dichloride in 75 mls of dry chlorobenzene. After refluxing for 10 hours, 2 ml of benzoyl chloride was added to end cap the polymer. After 2 hours the cloudy viscous mass was poured into 250 mls of methanol in a Waring blender and the polymeric precipitate collected by filtration. The tin residues were extracted in methanol overnight.

The structure of the polymer was confirmed by 'H n.m.r. spectroscopy and infra-red spectrophotometry.

The polymer had a reduced viscosity of 0.60 dl/g (1% solution in o-chlorophenol).

A similar material was prepared from 2,2'-bis(4-hydroxyphenyl) propane, HO(CH₂CH₂CH₂CH₂O)₉H (Teracol 650, tradename from du Pont), tributyltin methoxide, isophthaloyl dichloride and terephthaloyl dichloride, having a reduced viscosity of 0.83 dl/g. (1% solution in chloroform).

EXAMPLE 19

Preparation of the co-polyester siloxane

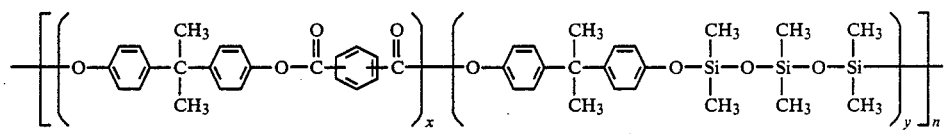

A mixture of 38.75 grams (0.1697 mol) of (2,2'-bis(4-hydroxyphenyl) propane, 109.00 grams (0.3395 mol) of tributyltin methoxide and 300 mls of dry chlorobenzene were heated to reflux. Methanol was removed as the by-product using a fractionating column. After all the methanol had been removed a further 100 mls of chlorobenzene was removed to ensure its complete removal. The stannylated bisphenol was allowed to cool to 90° C. To this solution was then added a mixture of 12.14 grams (0.0598 mol) of isophthaloyl dichloride and 12.14 g (0.0598 mol) of terephthaloyl dichloride in 100 mls of dry chlorobenzene. After half an hour at 90° C. a solution of 13.89 grams (0.0501 mol) of 1,5-dichlorohexamethyl trisiloxane was added in 50 mls of dry chlorobenzene. After refluxing for 10 hours the viscous mass was allowed to cool and then poured into cold (0° C.) methanol and the material broken up in a Waring blender. The fiberous polymer was collected by filtration and the tributyltin chloride residues extracted into diethyl ether overnight.

The structure of the polymer was confirmed by 'H n.m.r. spectroscopy and infra-red spectrophotometry.

The polymer had a reduced viscosity of 0.65 dl/g. (1% solution in chloroform).

EXAMPLE 20

Preparation of the polyester

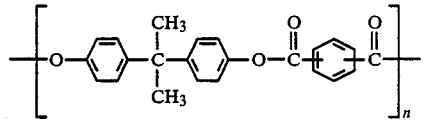

30.06 grams (0.0848 mol) of 2,2'-bis (4-hydroxyphenyl) propane and 54.46 grams (0.1696 mol) of tributyl tin methoxide were reacted together in 300 mls of dry chlorobenzene according to Example 13. To the stannylated bisphenol solution was then added a mixture of 15.03 g (0.0424 mol) of bis(phenylthio)isophthalate and 15.03 grams (0.0424 mol) of bis-(phenylthio) terephthalate in 100 mls of chlorobenzene. After refluxing for 15 hours the polymer was precipitated by pouring into methanol in a Waring blender. After filtration the tributyltin thiophenol residues were removed by extraction into methanol.

The structure of the polymer was confirmed by 'H n.m.r. spectroscopy and infra-red spectrophotometry.

The polymer had a reduced viscosity of 0.80 dl/g. (1% solution in chloroform).

EXAMPLE 21

Preparation of the polyester

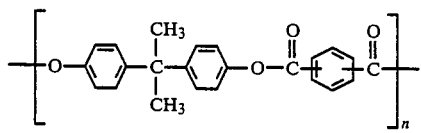

A mixture of 8.05 grams (0.0353 mol) of 2,2'-bis-(4-hydroxyphenyl) propane, 25.25 grams (0.0353 mol) of bis-triphenyltin oxide and 200 mls of dry chlorobenzene were heated to reflux. The water of reaction was removed using a Dean-Stark head. After all the water had been removed the solution was allowed to cool to 90° C. To this solution was added a mixture of 3.57 grams (0.0176 mol) of isophthaloyl dichloride and 3.57 grams (0.0176 mol) of terephthaloyl dichloride in 50 mls of dry chlorobenzene. After refluxing for 10 hours the polymer was precipitated into methanol in a Waring blender. The fiberous polymer was collected by filtration and triphenyltin chloride residues removed by extracting into methanol.

The polymer had a reduced viscosity of 0.63 dl/g. (1% solution in chloroform).

EXAMPLE 22

Preparation of the polyester

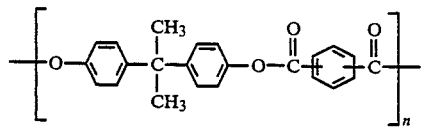

A mixture of 7.636 grams (0.03345 mol) of 2,2'-bis (4-hydroxyphenyl) propane, 8.410 grams (0.03345 mol) of bis (trimethylgermanium) oxide and 70 mls of dry chlorobenzene were heated to reflux in a nitrogen atmosphere for 4 hours. A Dean Stark trap was used to remove the water formed during the reaction. After all the water had been collected the reaction mixture was allowed to cool to 90° C. After cooling a 1:1 mixture of 6.791 grams (0.03345 mol) of isophthaloyl and terephthaloyl dichlorides in 20 mls of dry chlorobenzene was rapidly added. The reaction mixture was then refluxed for 30 hours and trimethyl germanium chloride removed as it was formed. After 30 hours the reaction mixture was colorless and had achieved maximum viscosity. The polyester was precipitated by pouring the reaction mixture into methanol in a Waring blender. The fiberous polymer was collected by filtration and residual trimethyl germanium chloride removed by washing with methanol.

'H n.m.r spectroscopy and infra-red spectrophotometry were consistent with the expected structure.

The polyester had an Rv=0.46 dl/g (1% solution in chloroform).

EXAMPLE 23

Preparation of the polyester

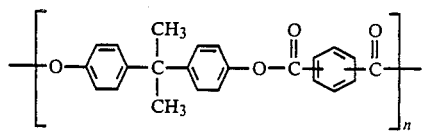

To a suspension of 12.89 grams (0.0565 mol) of 2,2'-bis(4-hydroxyphenyl) propane in 150 mls of dry chloroform at room temperature was added a solution of 15.64 grams (0.0565 mol) of 1,1'-dimethylstannocene in 50 mls of dry chloroform. After stirring at room temperature for 2 hours a solution of 11.47 grams (0.0565 mol) of a 1:1 mixture of isophthaloyl and terephthaloyl dichlorides in 50 mls of dry chloroform was added. The resultant mixture was stirred at room temperature for 10 hours and then heated to reflux for 4 hours. After cooling the viscous cloudy mixture was poured into one liter of methanol to precipitate the polymer. Co-precipitated stannous methoxide was removed by re-dissolving the polymer in chloroform, filtering and re-precipitating in methanol.

The 'H n.m.r. and the infra-red spectra of the material were consistent with the proposed structure.

The polymer had a reduced viscosity of 0.41 dl/g. (0.5% solution in chloroform).

EXAMPLE 24

Preparation of the polyester

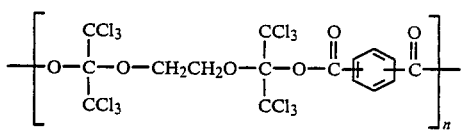

To a solution of 4.88 grams (0.0786 mol) of ethylene glycol in 100mls of dry chlorobenzene was added 50.47 grams (0.1572 mol) of tributyltin methoxide. The mixture was then heated to boiling and the methanol removed via a fractionating column. After all the methanol and 20 ml of chlorobenzene had been removed the mixture was allowed to cool to room temperature. To the cold solution was then added 41.62 grams (0.1572 mol) of hexachloroacetone and the resultant mixture stirred at room temperature for 1 hour. After this time a solution of 15.96 grams (0.1572 mol) of a 1:1 mixture of isophthaloyl and terephthaloyl dichlorides in 50 mls of chlorobenzene were added and the whole mixture stirred at room temperature for 4 hours and then heated to reflux for 4 hours. The polymerisation was terminated by pouring the mixture into methanol whereupon the polymer precipitated. After filtering off the product residual tributyltin chloride was removed by extracting with methanol.

The 1 H, n.m.r., $^{13}$C n.m.r. and infra-red spectra were consistent with the proposed structure.

We claim:

1. A method of making a polymer having a repeat unit of the formula

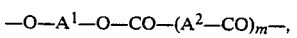

comprising reacting a nucleophilic reactant of the formula $$(R')_b M-O-A^1-O-M(R')_b$$

with a subtantially stoichiometric amount of an electrophilic reactant selected from the group consisting of
(i) a compound of the formula $$X-CO-A^2-CO-X;$$

(ii) a compound of the formula $$X-CO-X;$$

and
(iii) combinations of (i) and (ii); where
$A^1$ is an aromatic, aliphatic, aromatic/aliphatic, heterocyclic, or alicyclic moiety;
$A^2$ is an aromatic, aliphatic, aromatic/aliphatic, heterocyclic, or alicyclic moiety which may be the same as or different from $A_1$ or a direct bond;
m is 0 or 1;
each M is independently tin, germanium, lead or thallium;
each b is one less than the valence of the element M to which it pertains;
each R' is independently a substituted or unsubstituted alkyl or aryl group; and
X is halide, RO—, or RS—, where R is substituted or unsubstituted aromatic or aliphatic group or hydrogen.

2. A method of making a polymer having a repeat unit of the formula $$-O-A^1-O-CO-(A^2-CO)_m-,$$

comprising reacting a nucleophilic reactant of the formula $$(R')_b M-(O-A^1-O-M)_y-O-A^1-O-M(R')_b$$
$$\overset{(R')_a}{|}$$

with a substantially stoichiometric amount of an electrophilic reactant selected from the group consisting of
(i) a compound of the formula $$X-CO-A^2-CO-X;$$

(ii) a compound of the formula $$X-CO-X;$$

and
(iii) combinations of (i) and (ii); where
$A^1$ is an aromatic, aliphatic, aromatic/aliphatic, heterocyclic, or alicyclic moiety;
$A^2$ is an aromatic, aliphatic, aromatic/aliphatic, heterocycclic, or alicyclic moiety which may be the same as or different from $A^1$ or a direct bond;
m is 0 or 1;
each M is independently tin, germanium, lead or thallium;
each a is an integer two less than the valence of the element M to which it pertains;
each b is one less than the valence of the element M to which it pertains;
each R' is independently a substituted or unsubstituted alkyl or aryl group;
y is an integer greater than or equal to 1; and
X is a halide, RO—, or RS—, where R is a substituted or unsubstituted aromatic or aliphatic group or hydrogen.

3. A method according to claim 1 or 2 wherein M is tin.

4. A method according to claim 1 or 2 wherein M is germanium.

5. A method according to claim 1 or 2 wherein M is lead.

6. A method according to claim 1 or 2 wherein M is thallium.

7. A method according to claim 1 or 2 wherein $A^1$ is substituted, or unsubstituted p-phenylene, m-phenylene, 1,4-napthylene, 2,6-naphthylene, 2,6-pyridinediyl, C-1 through C-6 saturated or unsaturated alkylene, or -p-Ph-K-p-Php-Ph is p-phenylene and K is a direct bond, O, S, carbonyl, sulfone, or C-1 through C-6 saturated, unsaturated, or fluorinated alkylene.

8. A method according to claim 1 or 2 wherein $A^1$ is p-phenylene, m-phenylene, or -p-Ph-K-p-Phwhere K is sulfone, methylene, or isopropylidene.

9. A method according to claim 1 or 2 wherein $A^2$ is substituted or unsubstituted p-phenylene, m-phenylene, 1,4-napthylene, 2,6-naphthylene, 2,6-pyridinediyl, C-1 through C-6 saturated, unsaturated, or fluorinated alkylene, or a direct bond, or -p-Ph-K-p-Phwhere p-Ph is p-phenylene and K is a direct bond, O, S, carbonyl, sulfone, or C-1 through C-6 saturated, unsaturated, or fluorinated alkylene.

10. A method according to claim 1 or 2 wherein $A^2$ is p-phenylene, m-phenylene, or -p-Ph-K-p-Phwhere K is sulfone, methylene, or isopropylidene.

11. A method according to claim 1 or 2 wherein $A^1$ and $A^2$ are independently selected from the group consisting of p-phenylene, m-phenylene, and -p-Ph-K-p-Phwhere K is sulfone, methylene, or isopropylidene.

* * * * *